Figure 1:
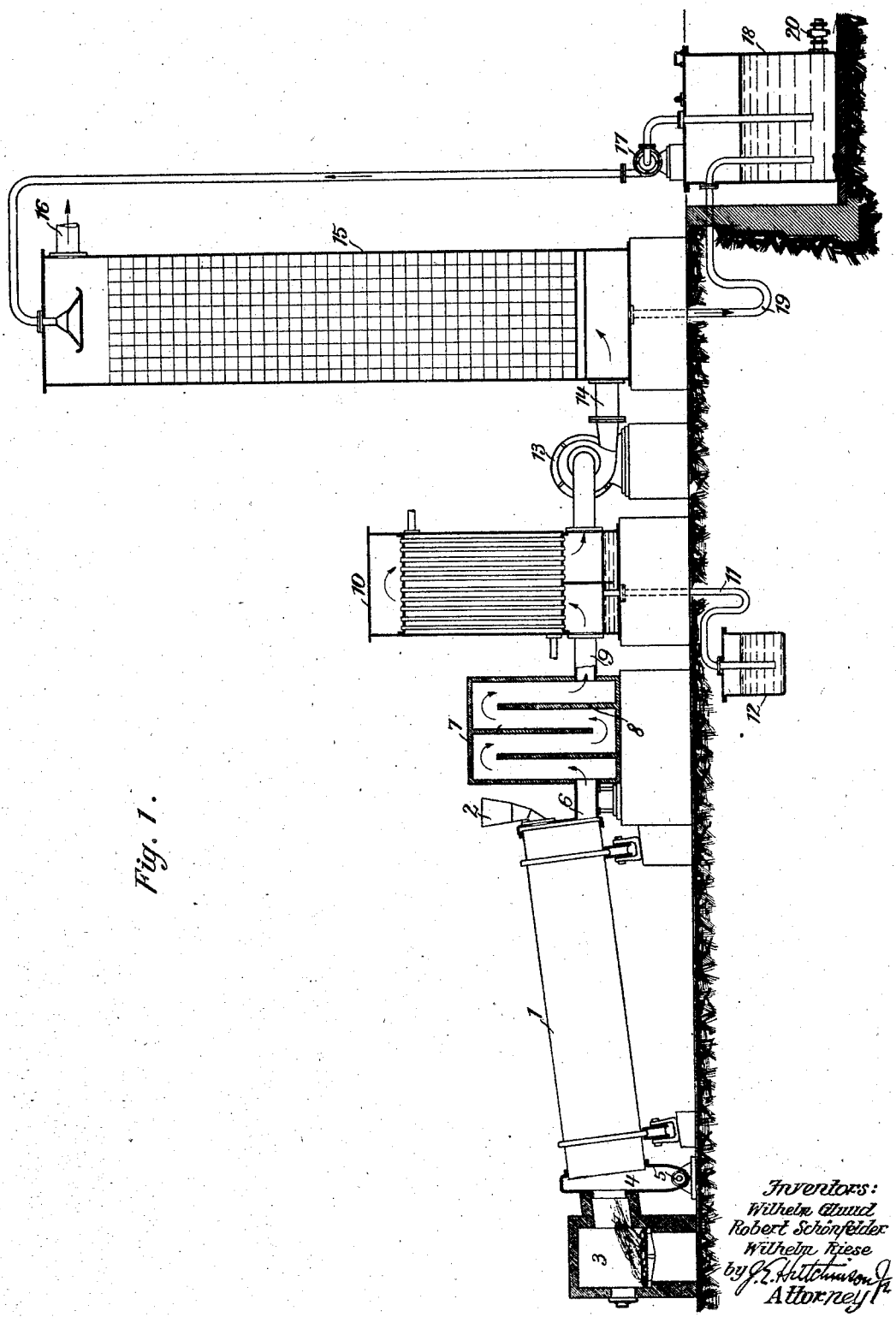
Figure 1A:
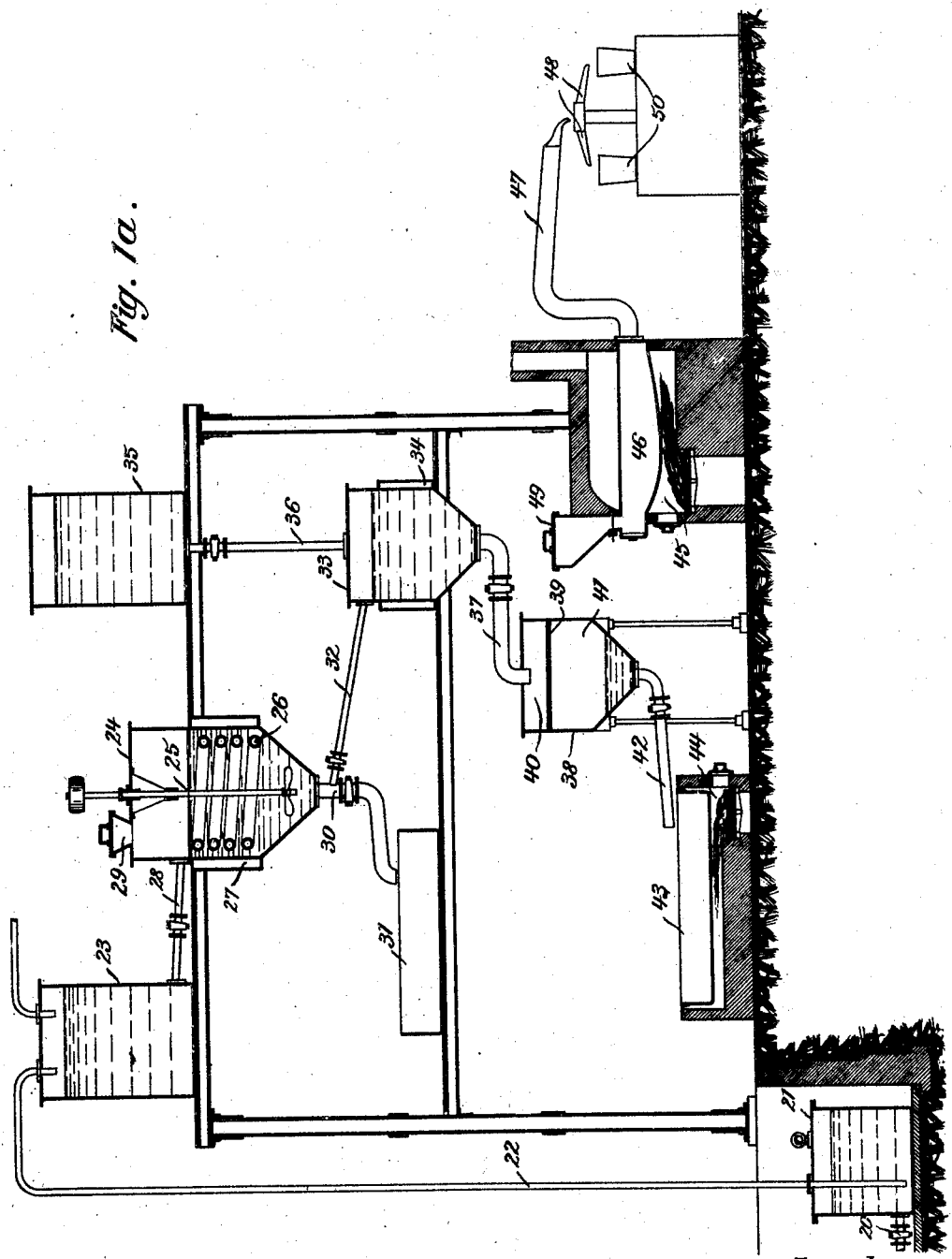

July 22, 1930. W. GLUUD ET AL 1,771,293
PROCESS FOR THE PRODUCTION OF PURE SULPHUR FROM
CRUDE IMPURE MATERIALS WHICH CONTAIN SULPHUR
Filed July 23, 1926 2 Sheets-Sheet 1

Inventors:
Wilhelm Gluud
Robert Schönfelder
Wilhelm Riese
by J. A. Hutchinson Jr.
Attorney

Patented July 22, 1930

1,771,293

UNITED STATES PATENT OFFICE

WILHELM GLUUD, ROBERT SCHÖNFELDER, AND WILHELM RIESE, OF DORTMUND-EVING, GERMANY, ASSIGNORS, BY MESNE ASSIGNMENTS, TO THE FIRM BERG-WERKSVERBAND ZUR VERWERTUNG VON SCHUTZRECHTEN DER KOHLENTECHNIK, GESELLSCHAFT MIT BESCHRANKTER HAFTUNG, OF DORTMUND-EVING, GERMANY

PROCESS FOR THE PRODUCTION OF PURE SULPHUR FROM CRUDE IMPURE MATERIALS WHICH CONTAIN SULPHUR

Application filed July 23, 1926, Serial No. 124,471, and in Germany August 6, 1925.

Our invention relates to a process for producing pure sulphur from crude material containing elementary sulphur and contaminated by admixture of organic or inorganic compounds, or both, for example, metal compounds.

Crude materials with a high content of elementary sulphur are provided by many industries as waste products, such for example as gas purifying materials in the dry or wet purification of illuminating gas by means of iron compounds. The sulphur content of such materials is sufficiently great for the commercial preparation of pure sulphur as a final product if it were possible to do it at sufficiently low cost and a minimum loss of sulphur, the final product being a high grade pure sulphur which would compare favorably as to quality with the products of Texas and Sicily now on the market.

Many attempts have been made to obtain pure sulphur from the crude sulfurous materials of the type mentioned, by leaching the materials with suitable solvents, chiefly organic solvents, such as benzine, gasoline, benzol, petroleum, carbon disulfide, trichlorethylene, dichlorbenzol, carbon tetrachloride and others. Solvents of this type are defective in that, together with the sulphur, they also dissolve organic impurities of the crude sulfurous materials, for example, naphthaline, tarry constituents, etc., so that the extracted sulphur is then an impure mixture requiring special preparation. This latter operation has proven too complicated or, if the process is limited to simpler purification methods, such for example as melting or distilling, chemical reactions arise between the sulphur and the admixtures, which not only exert a deteriorating influence on the process but also greatly reduce the yield of the final product, the pure sulphur.

Endeavor has also been made to extract sulphur from crude sulfurous materials of this type by means of aqueous solutions instead of organic solvents, the only known proposal therefor consisting in the use of ammonium sulfide solution. This method is, however, defective in that the ammonium sulfide used also reacts chemically with the admixed metallic compounds of the crude sulphur masses and forms metal sulfides which by reason of their volume and difficulty of removal greatly interfere with the process and require constant and valueless consumption of ammonium sulfide.

The chief purpose of our invention is to produce from impure raw or crude material of the type described, containing elementary sulphur, a high grade pure sulphur in the least expensive and most convenient manner.

A further object of our invention is to obtain the metal-containing residue from the above recovery of pure sulphur in a form which permits of its re-use for obtaining fresh quantities of crude sulfurous materials, for example in coal gas purifying methods.

A further object of our invention comprises, together with the treatment of the said crude materials containing elementary sulphur, the treatment of other materials containing sulphur chemically combined, so as to increase the yield of the pure sulphur to be obtained.

A further object of our invention consists in that in such case where the crude sulfurous materials to be treated are obtained as a by-product from the purification of coal gas, a portion of the sulphur to be obtained is combined with the ammonia of the coal gas also obtained as a by-product and thus saves a considerable proportion of otherwise necessary sulfuric acid.

Other further objects and characteristics of our invention will appear from the following specification and claims.

The chief characteristic feature of our invention consists in that the impure crude materials containing elementary sulphur are treated with a solution of alkali sulfite, for example, ammonium sulfite, with the application of heat, whereby the sulphur of the materials passes into solution and forms dissolved alkali thiosulfate, while the impurities, organic as well as inorganic, remain as insoluble residue. The reaction occurs according to the following Equation (1):

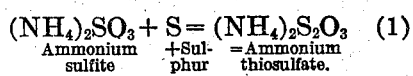

Considered alone, this reaction is well known to chemists. As novel, however, we consider the use of this reaction for solving the problem of obtaining from impure masses which contain sulphur this latter in pure state, as explained in detail hereinafter.

The sulphur can be precipitated from the alkali thiousulfate solution obtained, and from which the contaminating residue has been removed, in elementary practically pure state by methods known to chemists. The invention is not limited to the use of a certain method for the production of pure sulphur from the alkali thiosulfate solution. One of the simplest methods of this type, and one considered hereinafter, is the decomposition (treatment) of alkali thiosulfate solution by means of sulfuric acid according to the following Equation (2):

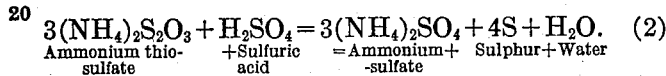
$$3(NH_4)_2S_2O_3 + H_2SO_4 = 3(NH_4)_2SO_4 + 4S + H_2O. \quad (2)$$
Ammonium thio- +Sulfuric =Ammonium+ Sulphur+Water
sulfate acid -sulfate A particularly advantageous form of the process, as carried out in practice, is described hereinafter with reference to the annexed drawing. On said drawing, Figs. 1 and 1ª, the latter being a continuation of the former, together show a purely diagrammatic elevation of a plant suitable for carrying out the process, most of the apparatus being shown in vertical section.

The operative principle of the plant consists in the production of gaseous sulfurous acid, by roasting, half the available crude material containing the elementary sulphur, while sulfurous acid serves for the production of ammonium sulfite solution, with which the remaining half of the original crude material is then caused to react. Since the production of gaseous sulfurous acid by roasting occurs equally well with the use of sulfurous material in which the sulphur is chemically combined, for example, with the use of pyrites, a portion of such pyrites may be preliminarily added to the crude material containing the elementary sulphur, and thus combine the half of the crude sulfurous material available for roasting partially of the original crude material and partially of specially added foreign sulfurous crude material. Thus the total amount of crude sulphur introduced and, in equal measure, the quantity of pure sulphur obtainable, are increased.

A particularly suitable crude material with a high content of elementary sulphur is the iron-containing crude sulphur being the product of the purification of coal gas according to our British Patent No. 271,805 for Process and installation for eliminating sulphuretted hydrogen from gases. This material is obtained in the by-product coking plants of collieries. In the latter, when washing the coking coal, often a waste product also becomes available, consisting mainly of pyrites and containing more or less sulphur, which waste is likewise a suitable additional material of the kind mentioned above. Finally, use is made of ammonia or ammoniacal water, but these are not lost. The process is therefore to be carried out with particular success in connection with by-product coke plants.

The process is carried out as follows in the plant according to the accompanying drawing.

Figures 1 and 1ª are elevational views showing the arrangement of parts.

Half of the sulfurous crude material, separated as described and, according to the foregoing explanation, consisting partly of original crude or raw material containing only elementary sulphur and partly of added raw material containing chemically combined sulphur, is introduced at 2 into the continuously driven rotary retort furnace 1, advanced therethrough continuously by the rotary movement and heated and roasted by the combustion gases of a furnace 3, whereby gaseous sulfurous acid ($SO_2$) forms and admixes with the combustion gases. The materials remaining as a residue of the roasting are discharged at 4 from the rotary furnace 1 through the discharge device 5. If the above mentioned raw material has been used, the residue consists mainly of iron oxides with some unattached sulphur in admixture therewith and may be re-used as a purifying agent in coal gas purification, the final product of which is again a raw material containing elementary sulphur, such as that forming the starting material of the process. The waste gases of furnace 1 containing the sulfurous acid pass through a pipe 6 into a chamber 7 with built-in diverting walls 8 for the purpose of depositing the dust, flue ashes, etc. carried along. From chamber 7 the gases thus purified but still hot pass through a pipe 9 into a tubular cooler 10 and are cooled, by water as a refrigerant, to about the surrounding temperature, about 30° C. On cooling, the water vapor (steam) of the gases precipitates as condensation water, which absorbs the slight admixture of sulphur trioxide ($SO_3$) formed in the roasting process, and also slight quantities of sulphur dioxide ($SO_2$), so that the condensate produced forms a dilute solution mainly of sulfuric acid ($H_2SO_4$) and a little sulfurous acid ($H_2SO_3$). This dilute acid flows through pipe 11 into a collecting reservoir 12. It may be utilized during the further course of the process as explained hereinafter. The sulfurous gases cooled in the tubular cooler 10, through the action of a gas exhauster 13, are passed from below through pipe 14 to a vertical scrubber tower 15 provided with a suitable filling material, leaving this tower through pipe 16, and finally escaping into the open, preferably through a chimney. The said scrubber 15 serves for the preparation of a solution of ammonium sulfite or the latter admixed with ammonium bi-sulphite from the sulphurous acid gases. For this purpose an aqueous absorption liquid is pumped in constant circulation over the filling material of scrubber 15 from a reservoir 18 by means of a pump 17, the liquid returning to the container 18 through the pipe 19. At the beginning of the process the absorption liquid may consist of pure water or of ammonia water, the latter being prepared in this case by admixing concentrated ammonia water with fresh water in reservoir 18. During the course of operation there is formed each time from this absorption liquid a solution of ammonium sulfite, which may contain also ammonium bi-sulphite since, as known, sulphite solutions are capable of dissolving further $SO_2$. The reactions taking place here are as follows (Equations 3 and 4):

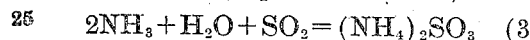
$$2NH_3 + H_2O + SO_2 = (NH_4)_2SO_3 \quad (3)$$
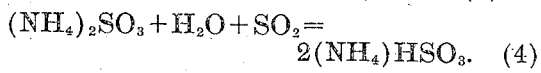
$$(NH_4)_2SO_3 + H_2O + SO_2 = 2(NH_4)HSO_3. \quad (4)$$

Of course, in the degree that sulfurous acid is taken up by the absorption liquid, fresh equivalent quantities of free ammonia must be added to the liquid. This is done by adding concentrated ammonia water into the reservoir 18. It is preferable to regulate this addition of free ammonia so that on continuous operation the circulating absorption liquid will never have an excess of free ammonia, and therefore, the gas discharging from scrubber 15 through pipe 16 will not pass ammonia out into the open, and thus lose it for the process. This requirement, that the circulating absorption liquid is never ammoniacal may be fulfilled if, at the time at which new ammonia water is added, the liquid contains a sufficient proportion of bisulphite.

A part of the ammonium sulfite and bisulphite solution formed is periodically passed from reservoir 18 through the discharge passage 20 provided with a check or regulating member into receptacle 21 (see Fig. 1ª). This receptacle 21 is connected by means of an ascending pipe 22 with a receptacle 23 for ammonium sulfite solution placed at a higher level. By the use of compressed air it is possible to transfer the liquid of container 21 into the elevated receptacle 23. In this latter the conveyed ammonium sulfite solution is first treated with so much free ammonia in the form of concentrated ammonia water that the liquid has a slight excess of ammonia, for a reason to be set forth hereinafter. The ammoniacal ammonium sulfite solution thus prepared serves for further use in the process, for the treatment of the unroasted remainder of the crude material containing the elementary sulphur, that is, the second half of the sulfurous crude material introduced into the process.

For this purpose there is provided a container 24 which has a stirring apparatus 25 and provided interiorly with steam heating coils 26 and, if necessary, with an outer steam heating jacket 27. Into this mixing container 24 a certain measured quantity of ammoniacal ammonium sulfite solution is passed from the elevated receptacle 23 through the passage 28 provided with a regulating member, and also, through the charging funnel 29, a likewise measured quantity of the raw material containing the elementary sulphur added. The content of receptacle 24 is now heated by heating coil 26 and steam jacket 27 to a temperature of about 90 to 100° C. and kept at this temperature, while at the same time the stirring mechanism is actuated. The process expressed in the abovementioned Equation (1) is thereby carried out. The ammonium sulfite of the solution reacts with the elementary sulphur of the raw material introduced, with formation of ammonium thiosulfate, which remains in solution. The progress of the process must be determined by repeatedly taking out tests in order to determine the duration of treatment and the proper moment for terminating it. When this process is terminated the stirring mechanism is shut off and all insoluble constituents allowed to deposit. The insoluble residue deposits surprisingly easily and well when the solution has a slight excess of ammonia which, moreover, has no effect on the process. For this reason a suitable excess of free ammonia is maintained in the elevated receptacle 23 for the preparation of the solution, as above described. The insoluble residue deposited in container 24 is then passed off at the discharge 30, provided with a check or control member and placed at the lowest point, into a suitable collecting reservoir 31. It is a slimy mass consisting mainly of iron oxygen and sulphur compounds together with some elementary sulphur. Like the residue from rotary furnace 1, this mass may be re-used for the purification of coal gas.

The clear solution of ammonium thiosulfate remaining in the agitating container 24 is passed through discharge pipe 32 provided with a regulating member, while still hot, into a lower placed receptacle 33, likewise provided with a steam heating jacket 34. At the same time a measured quantity of sulfuric acid is passed into this receptacle 33 from a container 35, at a higher level and containing a reservoir or store of sulfuric acid, through the pipe 36 provided with a regulating member. A portion of the dilute sulfuric acid collected in the condensate reservoir 12 may also be used therewith. The unused remainder of the condensate from the condensate reservoir 12 may, if desired, in order to eliminate it, be passed into the circuit of the absorption liquid pumped over the scrubber 15. The liquid mixture of ammonium thiosulfate solution and sulfuric acid is held at a temperature of 90° C. for about 8 hours in this container 33, by means of the steam heating jacket 34. The ammonium thiosulfate solution is thereby decomposed as shown by the above Equation (2). There is formed a precipitate of elementary sulphur and a solution of ammonium sulfate, in which the precipitated sulphur is suspended. After this decomposition operation is terminated this suspension is passed from container 33 through the passage 37 provided with a regulating check (control) member into the filter apparatus 38. This is subdivided by a horizontal filter floor or partition 39 into an upper compartment 40 and a lower compartment 41. Compartment 40 receives the suspension to be filtered, while 41 is maintained at sub-atmospheric pressure by means of a suction pump for the purpose of facilitating filtration. The liquid filtered off, mainly a solution of ammonium sulfate with traces of ammonium sulfite admixed therewith, is discharged from compartment 41 through the passage 42 preferably into an evaporating pan 43, which is heated by a furnace 44, for the purpose of obtaining from the solution the crystallized ammonia salt, which consists chiefly of ammonium sulfate. In coke plants, which are provided with a saturating apparatus for obtaining ammonium sulfate in solid form from ammonia vapors or gases and sulfuric acid, the evaporating apparatus 43, 44 may be omitted, as the ammonium sulfate solution running off through pipe 42 may be passed to the corresponding ammonia saturator, where solid ammonia salt is obtained from the solution introduced together with the ordinary saturating process.

The elementary sulphur collected above the filter floor 39 in compartment 40, after being washed with a little pure water, forms the product of the process and in this form is of fairly high grade purity. In case it is to be further purified the product may be subjected to simple purification methods, for example, a purifying melt (or fusion) or a distillation. Other similarly simple purifying methods may also be used. Since the impurities still admixed with the sulphur produced are present in extremely slight amount, their final removal, where this is desired, is easily effected by the means stated. In the present example it is assumed that the final purification of the sulphur obtained is effected by distillation. For this purpose there is provided a furnace 45 which contains a distilling retort 46. Attached to the latter is a vapour passage 47 acting both as a cooling and condensing apparatus, and the open end of which is connected with suitable mould 50 through distributing troughs 48. The sulphur to be purified is passed from the filter chamber 40 through a charging funnel 49 into the still retort 46 and the latter is heated by the fire of furnace 45. The sulphur introduced melts and finally vaporizes, the vapour cool and condense thru the cooling effect of the outer air, water cooling being used therewith if desired or necessary, in the passage 47 and are carried in liquid state through the troughs 48 into the moulds 50, in which the sulphur solidifies in a maximum state of purity. The slight traces of organic impurities contained in the sulphur when the latter is introduced into retort 46 are destroyed by the heating of the sulphur therein, and the slight traces of inorganic impurities, chiefly metallic compounds, which were dissolved in the treating (decomposition) liquid of container 33, remain in retort 46 as a solid residue which collects on the bottom of the retort after the distillation and may be scraped out.

From the foregoing description of the process it is apparent that the greater part of the sulphur introduced into the process, both elementary and chemically combined, is obtained at the end thereof as pure sulphur, and a smaller portion as sulfuric acid radical of the ammonium sulfate produced therewith, whose ammonia is introduced into the process in free form. Thus, all the sulphur introduced into the process, with the exception of very slight operating losses, is recovered in the form of a utilizable product. Even the operative sulphur losses of the process are in reality not losses because, as stated, they appear as residues of the retort 1 at the outlet 5 and of the stirring container 24 in the collecting reservoir 31, and these residues are returned directly for the purification of coal gas, for the production again of sulphur materials which are worked up to produce pure sulphur, in accordance with the process described. The method is one of the greatest simplicity and, since it requires less expense of maintainance, very cheap.

What we claim is:

1. The process of recovering sulphur from gas purifying processes which consists in treating said crude material with a solution of a sulfite to bring sulphur into solution, separating insoluble material therefrom and treating the solution of sulphur thereby obtained to precipitate sulphur therefrom.

2. In a process of recovering sulphur from gas purifying processes the steps which consist in treating the crude material with a solution of a sulfite and precipitating sulphur from the resultant solution.

3. In a process of recovering sulphur from gas purifying processes the steps which consist in treating the crude material with a solution of a sulfite to convert sulphur to a soluble compound thereof, and treating said compound with a reagent effective to precipitate free sulphur therefrom.

4. In a process of recovering sulphur from gas purifying processes the steps which consist in treating the crude material with an alkali sulfite and precipitating sulphur from the resultant solution.

5. In a process of recovering sulphur from gas purifying processes the steps which consist in treating the crude material with an ammonium sulfite and precipitating sulphur from the resultant solution.

6. In a process of recovering sulphur from gas purifying processes the steps which consist in treating the crude material with a solution of a reagent effective to convert sulphur into the form of a thiosuphate separating insoluble material from the resultant solution of thiosulfate, and treating the thereby clarified solution to decompose thiosulfate, with liberation of free sulphur.

7. In the process of recovering sulphur from gas purifying processes the steps which consist in utilizing a portion of said material to produce a reagent effective to bring sulphur into solution in the form of a compound thereof, and treating the remaining portion of the crude material with the reagent thereby obtained.

8. The process of recovering sulphur from gas purifying processes which consists in utilizing a portion of said material to produce a reagent effective to bring sulphur into solution in the form of a compound thereof, treating the remaining portion of the crude material with the reagent thereby obtained, separating insoluble material from the solution thereby obtained, and treating the clarified solution to precipitate free sulphur therefrom.

9. In the process of recovering sulphur from gas purifying processes the steps which consists in burning a portion of said material to produce a sulfite, and treating the remaining portion of the crude material with a solution of said sulfite to convert sulphur thereof into the form of a thiosulphate.

10. The process of recovering sulphur from gas purifying processes which consists in burning a portion of said material to produce a sulfite, treating the remaining portion of the crude material with a solution of said sulfite to convert the sulphur thereof into the form of a thiosulfate, and decomposing the solution of thiosulfate thereby obtained to precipitate free sulphur therefrom.

11. The process of recovering sulphur from gas purifying processes which consists in burning a portion of said crude material, treating the sulfurous gases thereby obtained with water to convert a portion of them into the form of sulphur-acid, treating the remaining gases with water and ammonia to form a solution of ammonium sulfite, treating the remaining portion of said crude material with said solution of ammonium sulfite, and treating the solution of ammonium thiosulfate thereby obtained with the sulphur-acid to precipitate free sulphur therefrom.

12. In a process of recovering sulphur from gas purifying processes the step which consists in treating said crude material to dissolve sulphur therefrom with a solution of a sulfite containing an excess of free ammonia.

13. In a process of recovering sulphur from gas purifying processes the steps which consist in treating said crude material to dissolve sulphur therefrom with a solution of a sulfite containing an excess of free ammonia, separating insoluble material from the solution thereby obtained, and treating the thereby clarified solution to precipitate free sulphur therefrom.

In testimony whereof we affix our signatures.

Dr. WILHELM GLUUD.
Dr. ROBERT SCHÖNFELDER.
Dr. WILHELM RIESE.